Patented Jan. 16, 1951

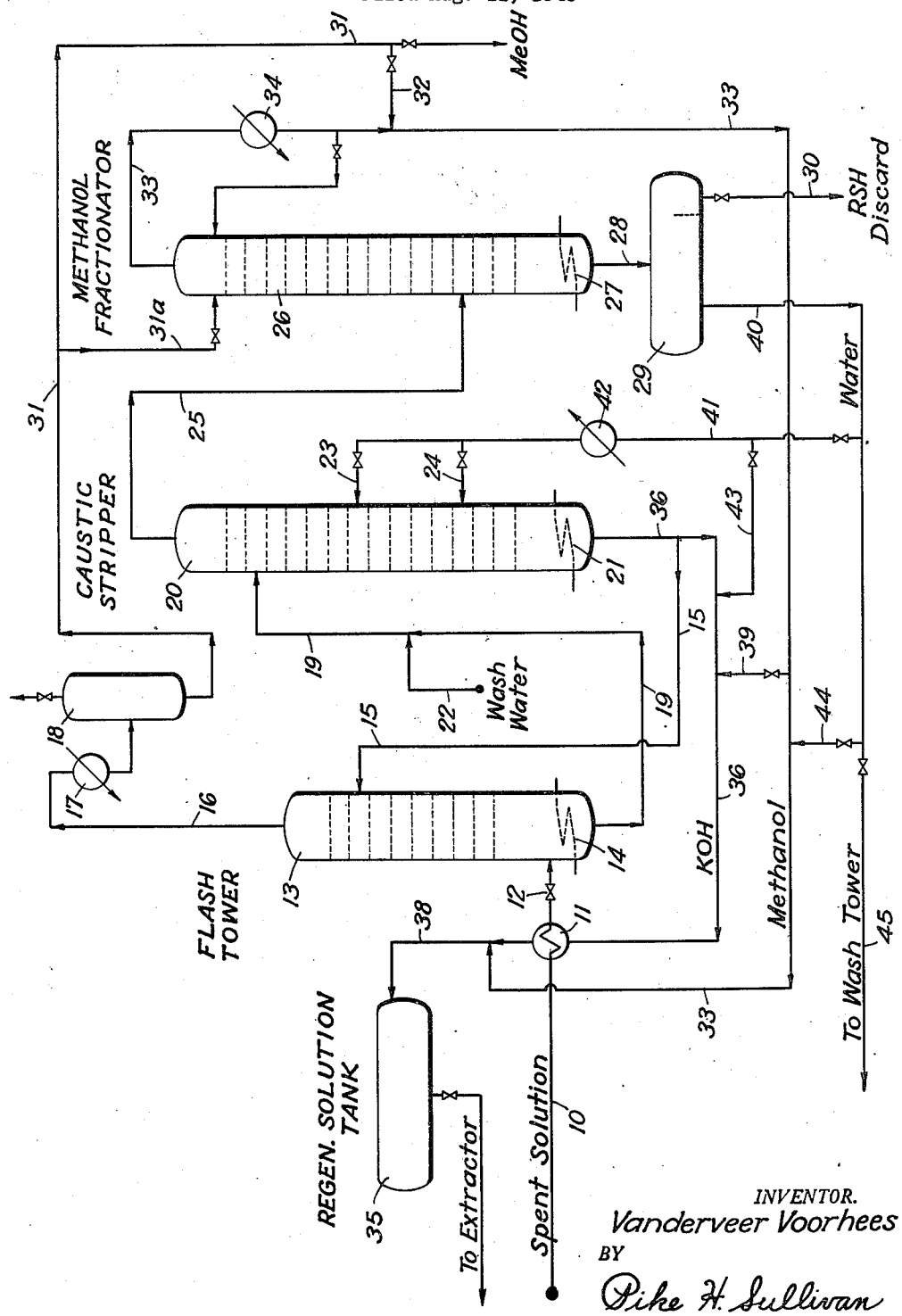

2,538,287

UNITED STATES PATENT OFFICE 2,538,287

REGENERATING ALCOHOL-CAUSTIC SOLUTION

Vanderveer Voorhees, Homewood, Ill., assignor to Standard Oil Company, Chicago, Ill., a corporation of Indiana Application August 11, 1948, Serial No. 43,708

4 Claims. (Cl. 196—32)

This invention relates to the extraction of mercaptans from petroleum distillates such as gasoline, kerosene, heater oil, etc., and more particularly it relates to the regeneration of caustic-methanol solutions employed as solvents for mercaptans in the extraction process. The invention is illustrated by a drawing which shows diagrammatically an apparatus suitable for carrying out the process.

The extraction of mercaptans from hydrocarbon oils, particularly low-boiling petroleum distillates, can be effected by boiling with caustic alkalies, particularly solutions of sodium and potassium hydroxide. Low molecular weight mercaptans such as methyl and ethyl mercaptans are soluble in aqueous alkali solutions to a sufficient extent to enable them to be separated from the hydrocarbons in a countercurrent or multistage extraction system. However, in case of heavier mercaptans found in higher boiling stocks, the separation with aqueous alkalies becomes increasingly difficult and in case of heavy naphthas, kerosenes and heater oils, separation is substantially impossible with aqueous alkali solutions. For treatment of such stocks, it has been the practice to employ methanol solutions of the caustic alkalies, in which case the alkali metal mercaptides which are formed on contact between the mercaptans and the sodium hydroxide or potassium hydroxide dissolve preferentially in the methanol. Methanol-caustic solutions in a wide range of composition have been proposed for this purpose but solutions containing a substantial amount of water have been found advantageous. In case of sodium hydroxide a very effective solution for mercaptan extraction is one in which 100 volumes of aqueous solution containing about 30 to 50 per cent NaOH is mixed with about 20 to 40 volumes of methanol. In the case of potassium hydroxide solutions, the concentration of KOH is preferably somewhat higher, e. g. 35 to 60 per cent in the aqueous portion.

After the solution has been contacted with the sour hydrocarbon and becomes contaminated with alkali mercaptides, it has been found necessary to regenerate it for re-use, inasmuch as the volume of solution required is quite considerable, e. g. about 10 to 40 per cent, usually about 20 per cent of the volume of the oil treated. Various methods have been proposed for carrying out the regeneration but most of them involve distillation of the methanol from the caustic solution and dissociation of the mercaptides by heating at elevated temperature generally in the presence of steam or added water. The recovery of substantially mercaptan-free methanol and caustic solutions is essential to the successful operation of the process because the return of mercaptans in the extraction solution increases the "re-entry value" thereby increasing the mercaptans in the extracted oil. It is usually desirable to produce extracted oil having a very low residual mercaptan content in order to meet trade specifications and obtain satisfactory performance of the oil in service. Because of their foul odor, the presence of even traces of mercaptans in many petroleum products is prohibitive. In the case of gasoline and heater oils, it is desirable that the finished oil have a copper number of less than about 3 to 10. The copper number is in milligrams of mercaptan sulfur per 100 milliliters of oil as determined by titration with a copper salt solution.

It has heretofore been difficult to regenerate the caustic-methanol solution employed in mercaptan extraction to provide a mercaptan-free methanol for recycling, because of the fact that mercaptans form azeotropes with methanol and cannot be readily separated by distillation even though the boiling ranges of the mercaptans and the methanol differ quite widely. Where only high-boiling mecaptans are being extracted, the amount of mercaptans in the methanol azeotrope is substantially less and this has been taken advantage of in some processes by fractionating the stock into heavy and light fractions and specially treating the low-boiling fractions. The carry-over of mercaptans with the methanol is generally aggravated by the presence of large volumes of water from which the methanol has to be fractionated for recycling. The presence of water in the methanol increases the formation of mercaptan azeotropes, and the separation of water from these ternary mixtures by fractionation is an expensive and difficult process requiring many plates in the fractionating tower and high reflux ratios.

In my process, the recovery of methanol substantially free of mercaptans is greatly facilitated by removing the methanol from caustic solution in two stages, substantially anhydrous methanol being removed in the first stage at relatively low temperature. A part or all of the anhydrous methanol so produced can then be employed as reflux in the methanol fractionating tower where mercaptans and water are separated from the remainder of the methanol. The process will be more readily understood by referring to the drawing in connection with which a typical operation of the process is as follows: Spent solution of caustic and methanol from the hydrocarbon extraction operation is conducted by line 10 to heat exchanger 11 wherein it is heated by waste heat to a temperature of about 200 to 250° F. The heated solution is flashed thru valve 12 into flash tower 13 maintained at about atmospheric pressure or slightly above, e. g. 5 to 10 p. s. i. Tower 13 is provided in the upper portion with contacting plates or packing, for example Raschig rings or Beryl saddles made of graphite which will resist the action of hot caustic alkalies. It is necessary to provide corrosion-resistant metals at all points of the system where the caustic alkali comes in contact with the metal while hot. Thus heat exchanger 11 and flash tower 13 may be suitably constructed of nickel alloys such as monel.

If insufficient heat has been added by exchanger 11, additional heat may be added to tower 13 by heating coil 14. It is desirable to add sufficient heat to vaporize not more than half the methanol contained in the solution introduced thru line 10, altho the amount of methanol vaporized in tower 13 may be considerably less, e. g. 20 to 30 per cent. The temperature required to do this is about 170 to 200° F., depending on the composition of the extracting solution employed. As the methanol vapors pass upwardly thru the tower they are contacted with a downflowing stream of caustic of high concentration introduced by line 15. Phenolic substances, particularly alkyl phenols, cresols or xylenols, can be present in the caustic solution. An aqueous caustic solution containing about 60 to 80 per cent KOH is suitable, altho somewhat lower concentrations can be employed, e. g. 50 to 55 per cent. Because of its high concentration, the caustic solution supplied by line 15 absorbs water from the methanol vapors and at the same time reacts with mercaptans which are carried in the vapors in the form of a methanol-mercaptan azeotrope, carrying the resulting mercaptides with the reflux to the bottom of the flash tower. Additional fractionation is provided above the point of introducing the caustic to separate from the methanol any water which has been evaporated from the caustic solution, thereby producing a substantially anhydrous methanol vapor stream which is conducted by line 16 to condenser 17 and receiver 18. Entrained caustic is also separated from the methanol by this means. However, entrained caustic can be separated in a later stage of the process if desired, as will be described.

From the base of flash tower 13, the caustic solution partially denuded of methanol is conducted by line 19 to caustic stripper 20 supplied by heat thru heating coil 21. Water for hydrolysis of mercaptides and vaporization of mercaptans is introduced either directly into the caustic solution by line 22 or into the stripper by lines 23 and 24. When introduced directly into the stripper it is preferred to add the water in the form of steam, preferably superheated, for example to a temperature of about 400 to 650° F. By adding sufficient heat as steam, the need for heating coil 21 may be obviated.

In stripper 20 substantially all the remaining methanol and the mercaptans are vaporized, alkali metal mercaptides being hydrolyzed by the action of the steam at the elevated temperature. The temperature in the base of stripper 20 may suitably be about 250 to 350° F. or higher, e. g. 400° F. The methanol, mercaptans and steam are conducted by vapor line 25 to fractionator 26 provided with reboiling coil 27. In fractionator 26, the water and mercaptans are separated from the methanol and withdrawn by line 28 leading to separating drum 29, where the mercaptans separate as an upper layer and are withdrawn by line 30. Fractionation and separation of water from methanol in tower 26 is facilitated by the introduction of substantially anhydrous, mercaptan-free methanol as reflux withdrawn from receiver 18 by line 31 and 31a. All or only part of the methanol taken overhead from flash tower 13 may be thus employed, depending on the reflux ratio desired in tower 26. Excess methanol above that amount may be conducted thru valved line 32 to the methanol recycle line 33.

Vapors of substantially water-free methanol are withdrawn from the top of tower 26, condensed in condenser 34, and the methanol thence conducted by line 33 to solution tank 35 where it is mixed with regenerated caustic solution for re-use in the process. The caustic solution substantially free of mercaptans is withdrawn by line 36 from the base of stripper 20 and conducted to heat exchanger 11 wherein it is cooled before being introduced by line 38 into regenerated solution tank 35, a portion being recycled by line 15 to the top of flash tower 13 as hereinabove described. Where the concentration of KOH in the base of stripper 20 is carried to a point above about 55 per cent, there is danger of solidification in exchanger 11, in which case this may be prevented by injecting a small amount of methanol into the caustic ahead of the exchanger by line 39.

From separating drum 29, water is withdrawn by line 40 and recycled to the extraction system. A part or all of the recycled water may be conducted by line 41 to caustic stripper 20, preferably in the form of steam generated by heating coil 42 as hereinbefore described. A portion of the water can be passed by line 43 to the caustic solution in exchanger 11 to maintain the caustic fluidity and adjust the concentration of water in the extraction solution in tank 35. Line 44 is also provided for this purpose, the water being led to tank 35 thru methanol line 33.

One of the problems encountered in the extraction of mercaptans from distillates with methanol solutions is the necessity for recovering methanol from the treated oil in which it dissolves to a small extent. This can be accomplished by washing the treated stock with water and recovering the methanol from the water by distillation. It is convenient, however, and more economical to employ a part of the recycle water in the process for this purpose. Thus water may be withdrawn by line 45, contacted with the treated stock, and returned to the regeneration system by line 22, both water and dissolved methanol being then revaporized in stripper 20.

Altho I have described employing the mercaptan-free methanol from flasher 13 as reflux in methanol fractionator 26, it may be used in other ways to improve the mercaptan extraction process. Thus it may be mixed with a portion of the regenerated caustic solution withdrawn from the bottom of stripper 20 by line 36 to provide a mercaptan-free caustic extraction solution which can be used in the final stage of caustic-methanol extraction following extraction with a solution containing some mercaptans produced with methanol derived from the vapors driven off in stripper 20. Thus the major portion of the mercaptans in the hydrocarbon stock may be removed by contacting with methanol-caustic solution not entirely free of mercaptans and then the final extraction may be accomplished by contacting with a mercaptan-free methanol-caustic solution comprising, for example, about 20 to 35 per cent of the total solution employed. A variation of this method of treating may also be employed wherein the regenerated caustic solution from heat exchanger 11 is charged to the top of the extraction column as shown in U. S. Patent 2,309,651, and two streams of methanol are recycled to the extractor. Mercaptan-contaminated methanol obtained by stripping and redistillation may be charged at an intermediate or low point in the tower extractor, mercaptan-free methanol being charged to the tower extractor at a higher point near the top of the extractor.

In addition to the caustic and the methanol components of the extraction solution, I may also employ other organic reagents to assist in mercaptan extraction, particularly in the case where heavier stocks are being extracted.

The heavy mercaptans contained in heavier stocks such as kerosene and heater oils are less soluble in the extraction solution and their removal can be improved by incorporating in the solution certain organic acids and phenolic substances, particularly alkyl phenols, cresols, or xylenols. These phenolic substances are often present in small concentrations in the stock undergoing treatment and tend to accumulate in the solution employed in the process, forming compounds with caustic alkali. In the regeneration of such solutions, these compounds remain with the caustic alkali and are withdrawn at the bottom of stripper 20 and recycled. Where separation occurs between the so-called cresylates and regenerated caustic solution, it is necessary to control the rate of recycle of the two portions in order to obtain a satisfactory regenerated solution. In general, the amount of recycled cresylates is within the range of about 2 to 20 per cent of the total regenerated solution, usually about 5 to 12 per cent. In an operation employing two solutions as hereinabove described, one having a higher re-entry mercaptan concentration than the other, separated cresylates are preferably employed in the solution having a higher mercaptan re-entry value.

Having thus described my invention what I claim is:

1. The process of regenerating a spent caustic methanol solution containing mercaptans derived from a mercaptan-extraction operation which comprises heating the solution above the boiling point of methanol and distilling off in a first distillation zone a portion of the methanol contained therein substantially free of mercaptans, further heating the solution to a higher temperature in a second distillation zone and distilling off substantially all the remaining methanol together with the mercaptans and water, fractionating the mixture of methanol, mercaptans and water in a fractionating zone, thereby separating methanol from said mercaptans and water, and combining the recovered methanol from said first distillation zone and said fractionating zone with caustic solution from said second distillation zone to reproduce the desired regenerated caustic-methanol extraction solution.

2. The process of claim 1 wherein the amount of methanol distilled in said first distillation zone is approximately 20 to 50 per cent of the total methanol in said spent caustic methanol solution.

3. The process of claim 1 wherein the methanol vapors in said first distillation zone are contacted with caustic alkali to remove mercaptans therefrom and the resulting alkali metal mercaptides are combined with caustic methanol solution treated in said second distillation zone.

4. The process of extracting mercaptans from a sour hydrocarbon distillate which comprises contacting said distillate in two successive extraction stages with a solution of potassium hydroxide, methanol and water containing about 20 to 40 volumes of methanol for each 100 volumes of aqueous potassium hydroxide solution having a concentration of about 35 to 60 per cent KOH, separating the mercaptan-contaminated spent caustic-methanol solution from the hydrocarbon distillate, heating said caustic methanol solution to a temperature less than about 200° F. and vaporizing therefrom in a first vaporizing zone about 20 to 50 per cent of the methanol contained therein, substantially mercaptan free, conducting the unvaporized caustic-methanol solution to a second vaporizing zone, and vaporizing therein substantially all remaining methanol and mercaptans in the presence of added steam at a temperature of about 250 to 350° F., conducting the vapors of methanol, mercaptans and steam to a fractionating zone and withdrawing therefrom a methanol distillate substantially free of water but contaminated with some mercaptans, withdrawing a strong caustic solution substantially free of mercaptans from the bottom of said second vaporizing zone, contacting a portion of said strong caustic solution with the vapors of methanol in said first vaporizing zone to remove mercaptans therefrom, combining a part of the strong caustic solution with recovered methanol from said fractionating zone and contacting it with sour hydrocarbon distillate in a first extraction stage, combining another part of said strong caustic solution with methanol from said first vaporizing zone and contacting it in a second extraction stage with the petroleum distillate from said first extraction stage.

VANDERVEER VOORHEES.

REFERENCES CITED

The following references are of record in the file of this patent:

UNITED STATES PATENTS

| Number | Name | Date |
|---|---|---|
| 2,269,467 | McCullough | Jan. 13, 1942 |
| 2,309,652 | Leum et al. | Feb. 2, 1943 |
| 2,437,348 | Brown et al. | Mar. 9, 1948 |

OTHER REFERENCES

Oil and Gas Journal, Nov. 3, 1945, pages 105, 106, 109.